(12) United States Patent
Nolet et al.

(10) Patent No.: US 9,290,048 B2
(45) Date of Patent: Mar. 22, 2016

(54) WHEEL BUILT-IN LOCKING SYSTEM AND METHOD

(71) Applicant: IPL, Inc., St-Damien (CA)

(72) Inventors: Roch Nolet, St-Damien (CA); Marc Talbot Pouliot, Saint-Lazare (CA)

(73) Assignee: IPL, Inc, St-Damien (CA)

(*) Notice: Subject to any disclaimer, the term of this patent is extended or adjusted under 35 U.S.C. 154(b) by 320 days.

(21) Appl. No.: 13/834,222

(22) Filed: Mar. 15, 2013

(65) Prior Publication Data

US 2013/0313890 A1 Nov. 28, 2013

Related U.S. Application Data

(60) Provisional application No. 61/651,668, filed on May 25, 2012.

(51) Int. Cl.
| | | |
|---|---|---|
| B60B 27/02 | (2006.01) | |
| B60B 27/06 | (2006.01) | |
| B60B 37/00 | (2006.01) | |
| B60B 7/00 | (2006.01) | |
| B60B 7/08 | (2006.01) | |
| B60B 37/10 | (2006.01) | |
| B60B 7/06 | (2006.01) | |

(52) U.S. Cl.
CPC ............... *B60B 27/02* (2013.01); *B60B 7/0013* (2013.01); *B60B 7/08* (2013.01); *B60B 27/065* (2013.01); *B60B 37/00* (2013.01); *B60B 37/10* (2013.01); *B60B 7/066* (2013.01)

(58) Field of Classification Search
CPC ...... B60B 3/001; B60B 27/06; B60B 27/065; B60B 37/04

USPC ................................ 301/111.01, 121, 111.03
See application file for complete search history.

(56) References Cited

U.S. PATENT DOCUMENTS

| | | |
|---|---|---|
| 3,870,371 A | 3/1975 | Solomon |
| 3,985,392 A | 10/1976 | Bergmann et al. |
| 4,043,603 A | 8/1977 | Bergmann et al. |
| 4,043,685 A | 8/1977 | Hyams |
| 4,043,686 A | 8/1977 | Hackett |
| 4,896,899 A | 1/1990 | Lawrence |
| 5,156,533 A | 10/1992 | Hoffman et al. |
| 5,215,356 A | 6/1993 | Lin |
| 5,234,226 A | 8/1993 | Liu |
| 5,238,297 A | 8/1993 | Sanders |
| 5,277,480 A | 1/1994 | Chiu |
| 5,368,371 A | 11/1994 | Markling |
| 5,577,843 A | 11/1996 | Leininger et al. |
| 5,593,174 A | 1/1997 | Graziano et al. |

(Continued)

FOREIGN PATENT DOCUMENTS

| | | |
|---|---|---|
| CA | 2092954 | 10/1993 |
| CA | 2273901 | 4/2000 |

(Continued)

*Primary Examiner* — Jason Bellinger
(74) *Attorney, Agent, or Firm* — Locke Lord LLP; Howard M. Gitten (57) ABSTRACT

A wheel having an axle receiving bore. The bore having at least one finger integral with the wheel extending towards the front wall of the wheel. The finger having a detent facing inwardly into the axle receiving bore. The finger is flexed outwards for insertion of the axle within the axle receiving bore, and flexed inwards to insert the detent into a notch of the axle once the axle is inserted in the axle receiving bore.

15 Claims, 15 Drawing Sheets

(56) References Cited

U.S. PATENT DOCUMENTS

| | | |
|---|---|---|
| 5,716,107 A | 2/1998 | Parker et al. |
| 5,902,018 A | 5/1999 | Owen et al. |
| 5,938,294 A | 8/1999 | Chan |
| 6,099,083 A | 8/2000 | Logan |
| 6,116,700 A | 9/2000 | Herrera |
| 6,120,106 A | 9/2000 | Liao |
| 6,149,245 A | 11/2000 | Wu |
| 6,170,920 B1 | 1/2001 | Markling |
| 6,189,979 B1 | 2/2001 | Wu |
| 6,280,001 B1 | 8/2001 | Parker et al. |
| 6,286,910 B1 | 9/2001 | Kuhlman |
| 6,328,320 B1 | 12/2001 | Walski et al. |
| 6,354,670 B1 | 3/2002 | Cheng |
| 6,361,121 B1 | 3/2002 | Morris |
| 6,375,274 B1 | 4/2002 | Morris |
| 6,464,305 B2 | 10/2002 | Markling |
| 6,561,593 B2 | 5/2003 | Godwin |
| 6,637,835 B2 | 10/2003 | Morris |
| 6,666,526 B1 | 12/2003 | Cummins |
| 7,108,335 B2 | 9/2006 | Morris |
| 7,445,297 B2 * | 11/2008 | Mercier et al. ........... 301/111.04 |
| 7,591,592 B2 | 9/2009 | Beirne et al. |
| 8,608,253 B1 * | 12/2013 | Sheefel ....................... 301/105.1 |
| 8,944,524 B1 * | 2/2015 | Sheefel .................. B60B 37/10 |
| | | 301/111.01 |
| 2002/0089229 A1 * | 7/2002 | Morris ........................... 301/9.1 |
| 2004/0070262 A1 | 4/2004 | Markling |
| 2004/0070263 A1 | 4/2004 | Morris |

FOREIGN PATENT DOCUMENTS

| | | | | |
|---|---|---|---|---|
| CA | 2358032 | | 4/2002 | |
| CA | 2425512 | | 4/2002 | |
| CA | 2472600 | | 7/2003 | |
| CA | 2564950 | | 11/2005 | |
| CA | 2598352 | | 8/2006 | |
| CA | 2530970 | | 6/2007 | |
| EP | 00180307 | * | 9/1985 | ............. B60B 37/10 |
| WO | 9962728 | | 12/1999 | |
| WO | 03059653 | | 7/2003 | |

* cited by examiner

FIG_6

FIG. 7

WHEEL BUILT-IN LOCKING SYSTEM AND METHOD

CROSS REFERENCE TO RELATED APPLICATIONS

This application claims benefit of U.S. provisional application Ser. No. 61/651,668, filed on May 25, 2012. All documents above are incorporated herein in their entirety by reference.

FIELD OF THE INVENTION

The present invention relates to a wheel assembly for mounting a wheel to an axle as well as to enable removal of the wheel from the axle.

SUMMARY OF THE INVENTION

More specifically, in accordance with the present invention, there is provided a wheel for mounting to an axle of a wheeled product, the wheel comprising an axle receiving bore extending from a front wall to a rear wall of the wheel; the axle receiving bore comprising at least one finger integral with the wheel and extending towards the front wall of the wheel, the finger comprising a detent facing inwardly into the axle receiving bore, the finger being adapted to be flexed from an insertion position to a locking position and from a locking position into an unlocking position, wherein the finger is flexed outwards in the insertion position as the axle is inserted within the axle receiving bore, and the finger is flexed inwards to insert the detent into a notch of the axle once the axle is inserted in the axle receiving bore in the locking position; and the finger is flexed outwards thereby disengaging the detent from the notch in the unlocking position.

There is further provided a wheel assembly, comprising an axle and a wheel having an axially extending axle receiving bore comprising at least one finger extending towards a front wall of the wheel, the finger comprising a detent facing inwardly into the axle receiving bore, the detent releasingly engaging the axle in the axle receiving bore by flexing radially of the finger.

There is further provided a wheel with a built-in locking system for locking the wheel to an axle, the wheel comprising an axle receiving bore comprising fingers extending towards a front wall of the wheel, each finger comprising a detent facing inwardly into the axle receiving bore, the detents releasingly engaging the axle in the axle receiving bore by flexing radially of the fingers.

Other objects, advantages and features of the present invention will become more apparent upon reading of the following non-restrictive description of specific embodiments thereof, given by way of example only with reference to the accompanying drawings

DESCRIPTION OF EMBODIMENTS OF THE INVENTION

The wheel 10 as illustrated in FIGS. 1, 2, 8, 9 and 10 for example comprises an axle receiving bore 12 with a built-in locking element for an axle, i.e. the locking element is integrally formed with the wheel 10.

Figure 1:
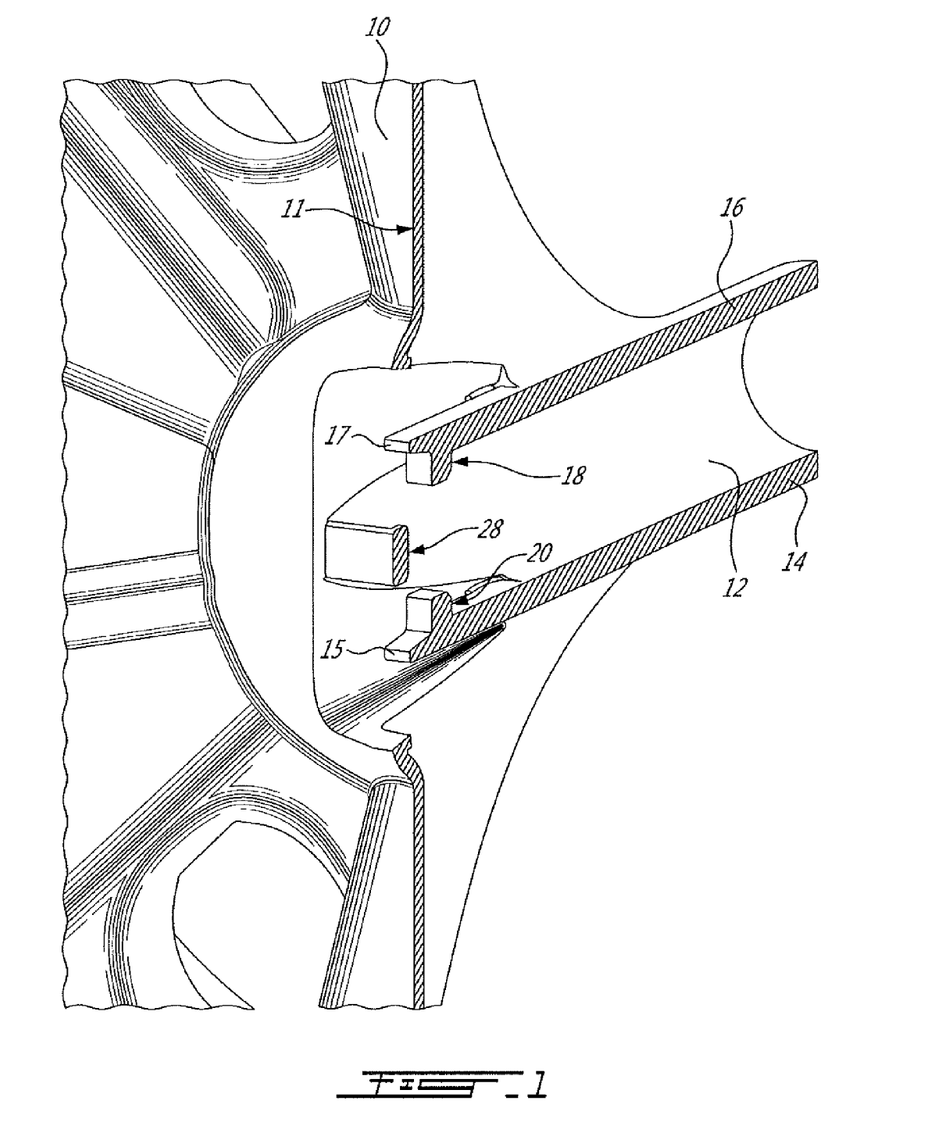
FIG. 1 shows a section of a wheel according to an embodiment of an aspect of the present invention.
Figure 2:
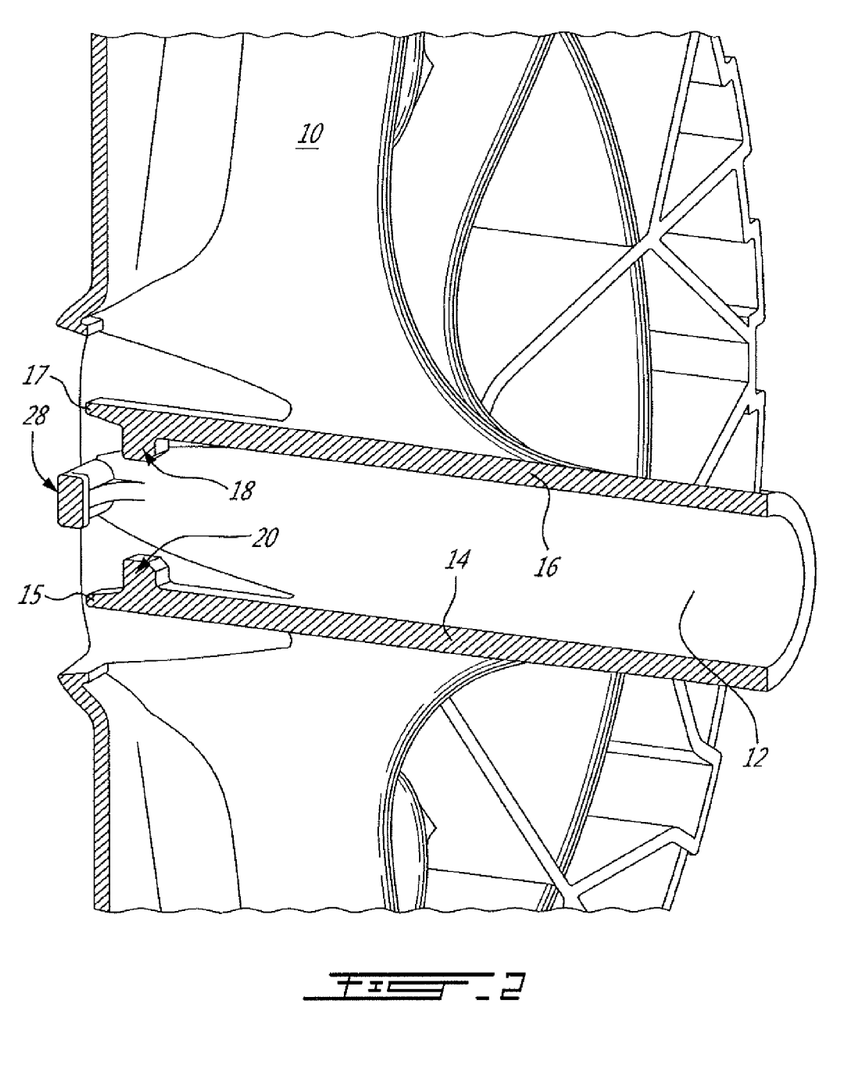
FIG. 2 shows a section of a wheel according to an embodiment of an aspect of the present invention.
Figure 3:
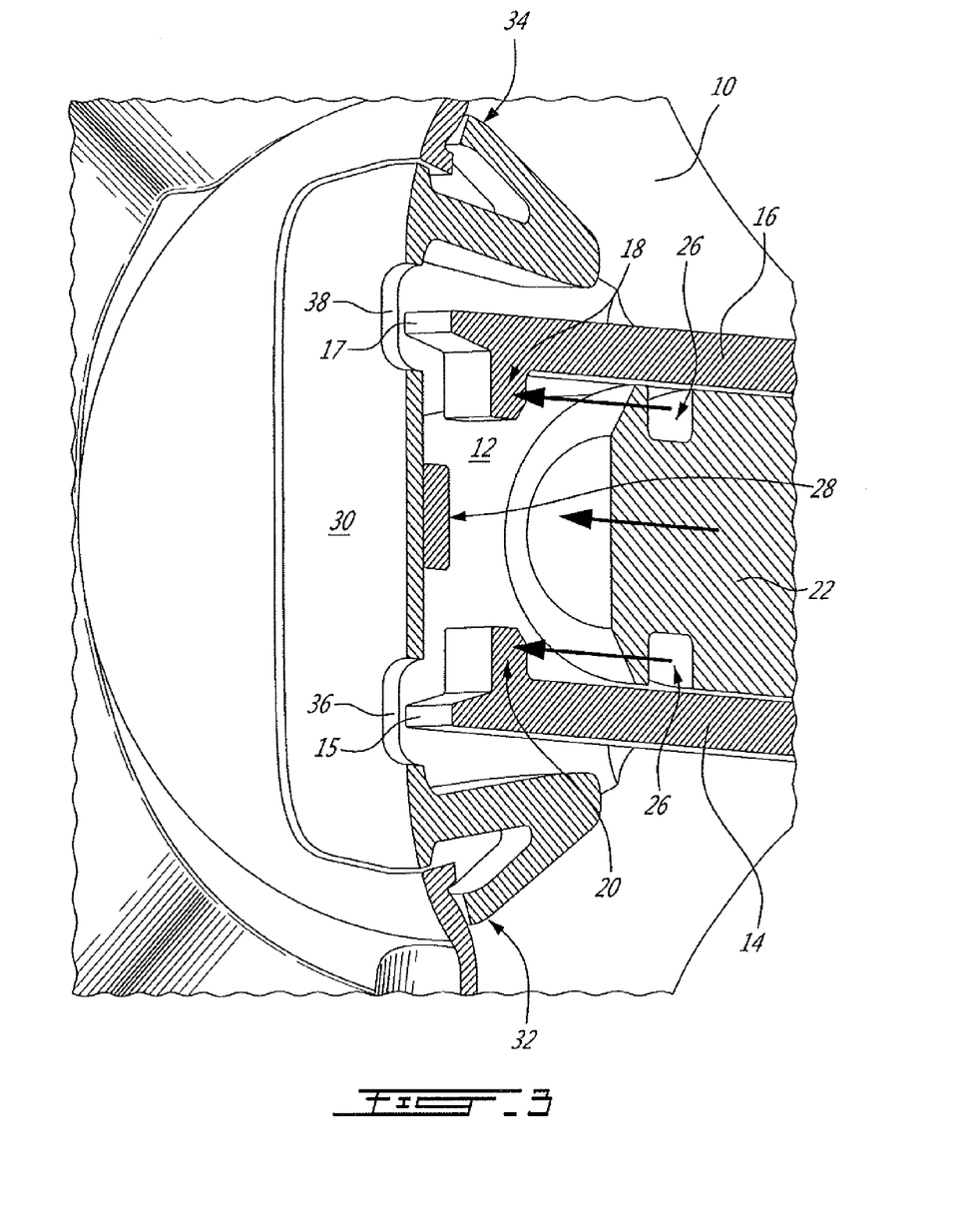
FIG. 3 shows a section of a wheel assembly according to an embodiment of an aspect of the present invention, during insertion of an axle, and an outer cap.

As best seen in FIGS. 1 and 2, the axially extending axle receiving bore 12 comprises two fingers 14 and 16, integral with the wheel 10, extending towards the front wall 11 of the wheel 10, with a free end thereof 15, 17 coming generally flush with, or slightly recessed from, the front wall 11 of the wheel 10 (see FIGS. 1 and 3). Each finger 14, 16 has a detent 18, 20 facing inwardly, into the axle receiving bore 12. The detents 18, 20 form a locking element for an axle 22 in the axle receiving bore 12, the detents releasingly engaging the axle in the axle receiving bore 12 by flexing radially of the fingers as will be described hereinbelow in relation to FIGS. 3-7.

The fingers 14, 16 are capable of being flexed away from the access of the axle receiving bore 12 as the axle 22 is inserted within the axle receiving bore 12 (see arrows in FIG. 3). The fingers 14, 16 then return into position to insert the detents 18, 20 into notches 24, 26 of the axle 22 (see FIGS. 4-7). A stopper 28, integral with the wheel 10, prevents the axle 22 from being pushed outward of the front wall 11 of the wheel 10 upon insertion (see FIG. 3). The notches 24, 26 of the axle 22 may be two separate notches formed at two diametrically opposite position on the circumference of the axle 22. Alternatively, the notches 24, 26 may be two diametrically opposite positions in a continuous circumferential notch on the circumference of the axle 22, which allows a decoupling between the rotation of the wheel and the rotation of the axle.

Figure 9:
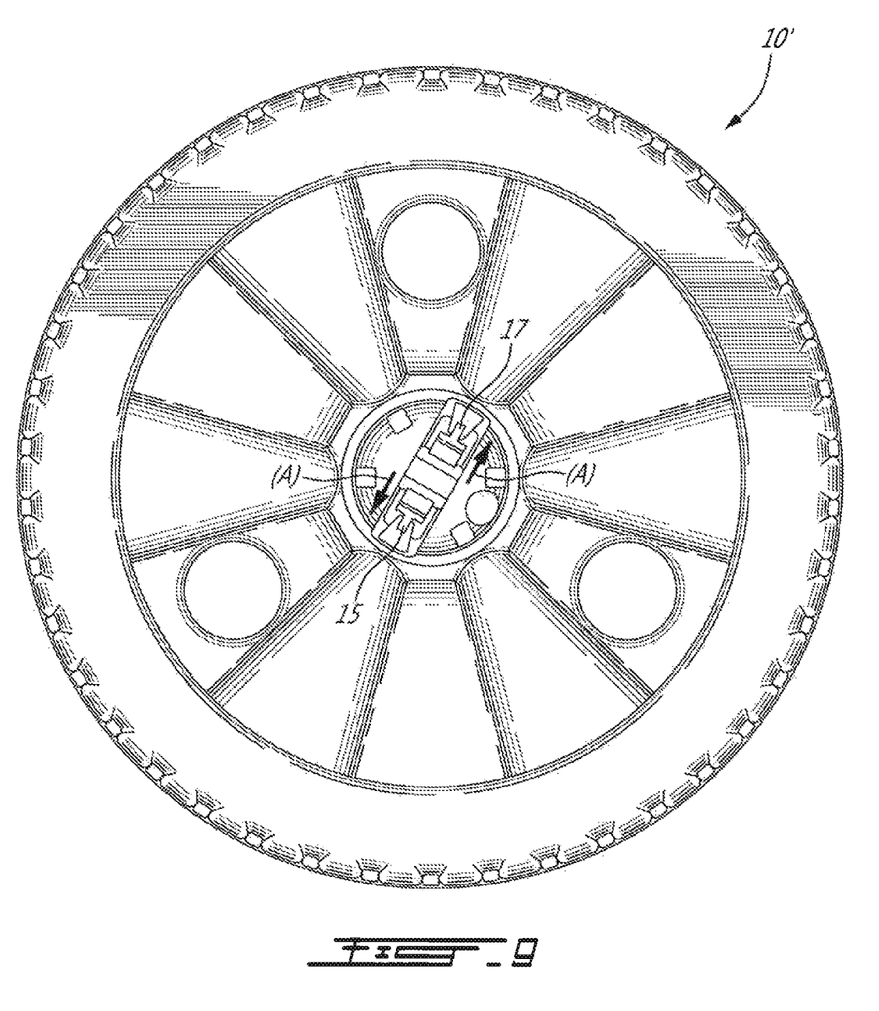
FIG. 9 is a front view of a wheel according to an embodiment of an aspect of the present invention.

Once the axle 22 is inserted within the axle receiving bore 12, as shown in FIGS. 4-7 and 13 for example, it may be unlocked from the axle receiving bore 12 by pushing, from the front of the wheel, on the free ends 15, 17 of the fingers 14, 16 (see arrows (A) in FIG. 9), so as to flex the fingers 14, 16 outwards and disengage the detents 18, 20 from the notches 24, 26 of the axle 22. A tool may be used for thus contactingly disengaging the detents from the axle by pushing on the free ends 15, 17 of the fingers 14, 16 (in FIG. 13: wheel 10" and fingers 14" and 16" respectively).

Figure 8:
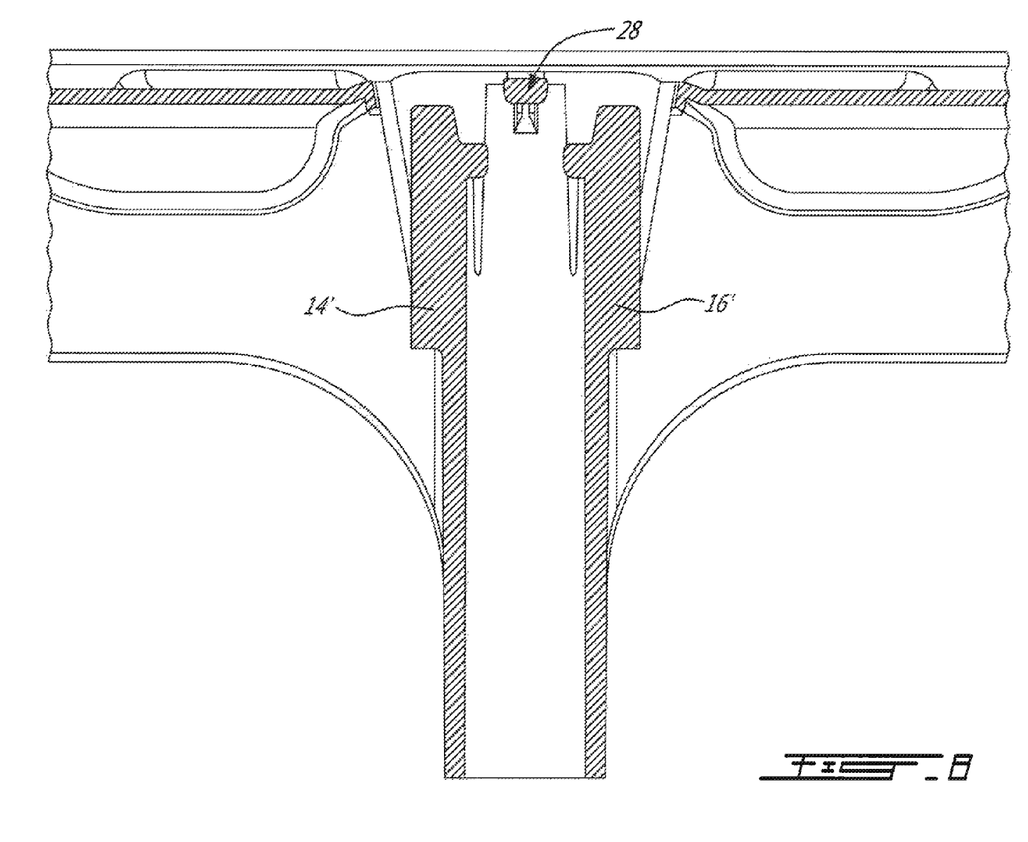
FIG. 8 is a section of a wheel according to an embodiment of an aspect of the present invention.

FIG. 8 is a cross section of a wheel of the present invention at the position of the fingers 14' and 16' of the wheel.

Figure 10:
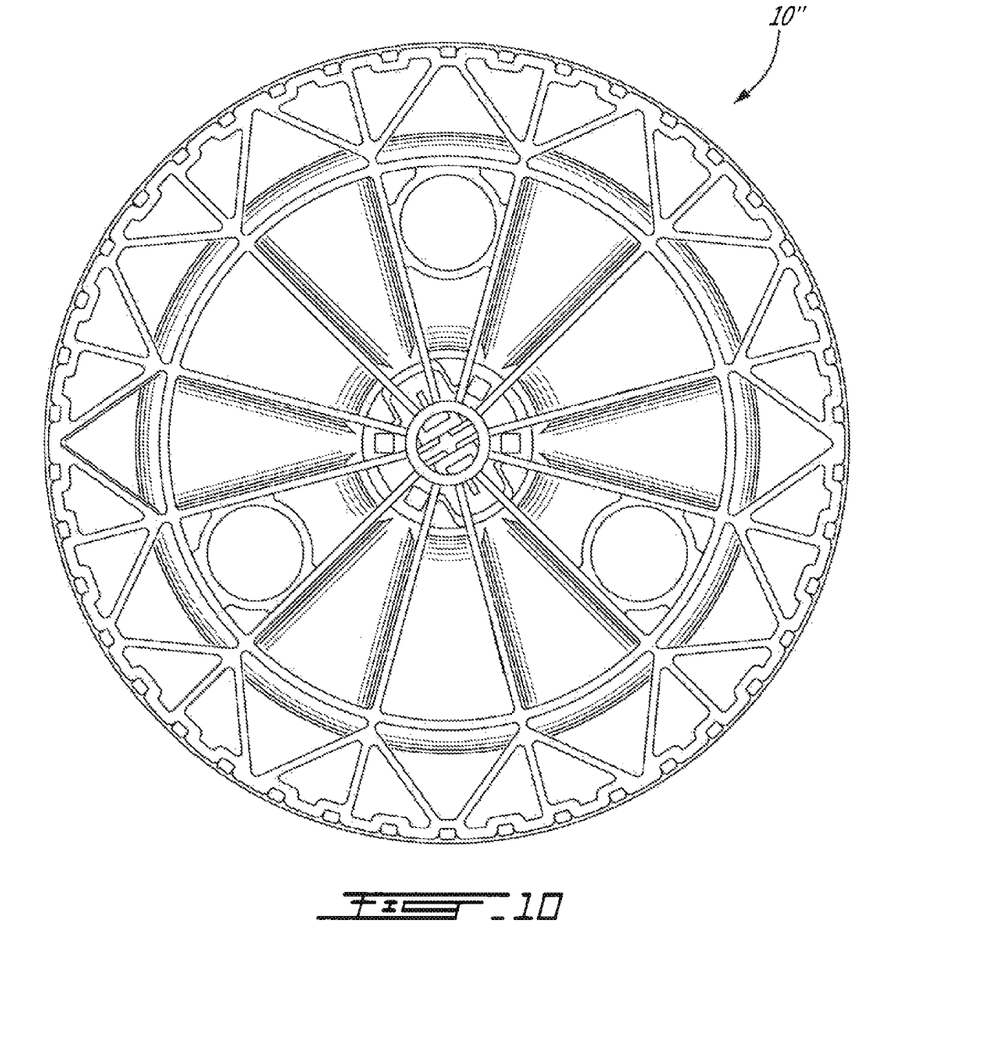
FIG. 10 is a rear view of a wheel according to an embodiment of an aspect of the present invention.

FIG. 9 is a front view of a wheel 10' of the present invention, and FIG. 10 is a rear view of a wheel 10" of the present invention.

The present wheel is infected molded, in a single step. For a wheel assembly comprising such a wheel molded in polyethylene for example and an axle, tests have shown a pull-out resistance force of up to 160 kgf at ambient temperature.

Figure 14:
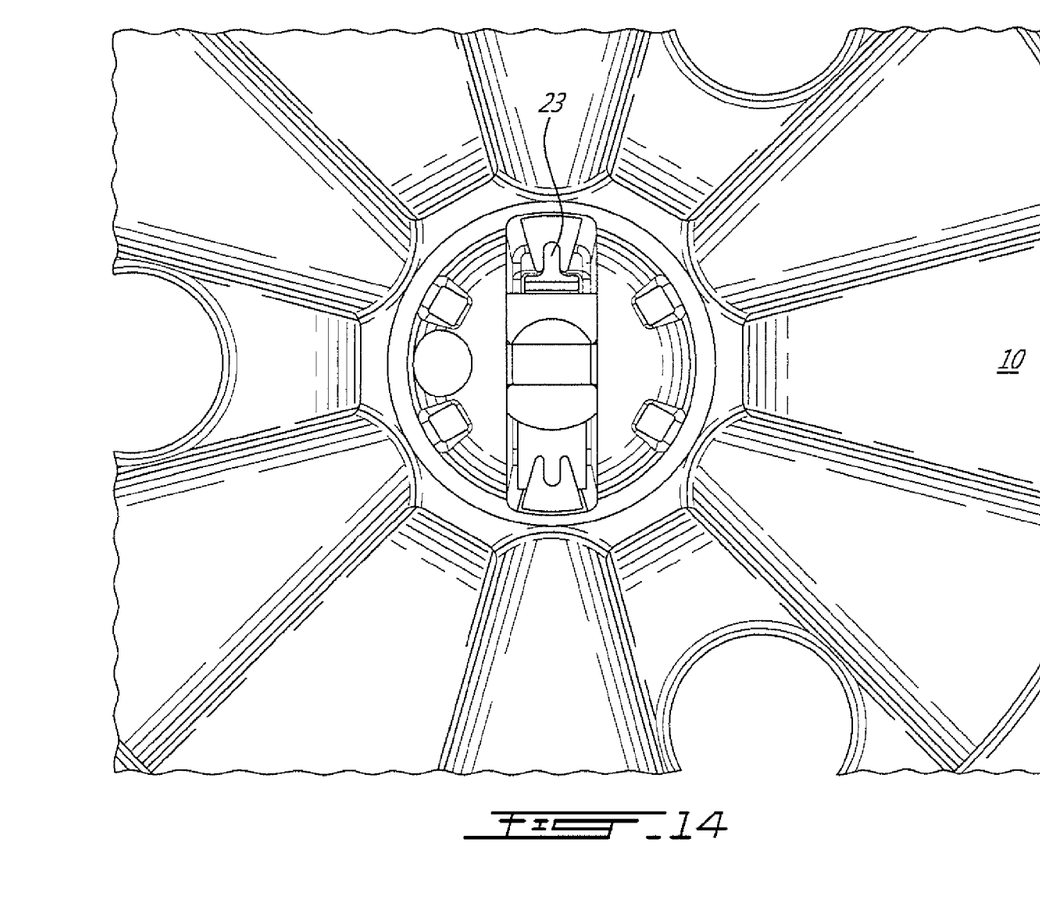
FIG. 14 is a front view of a wheel according to an embodiment of the present invention.
Figure 15:
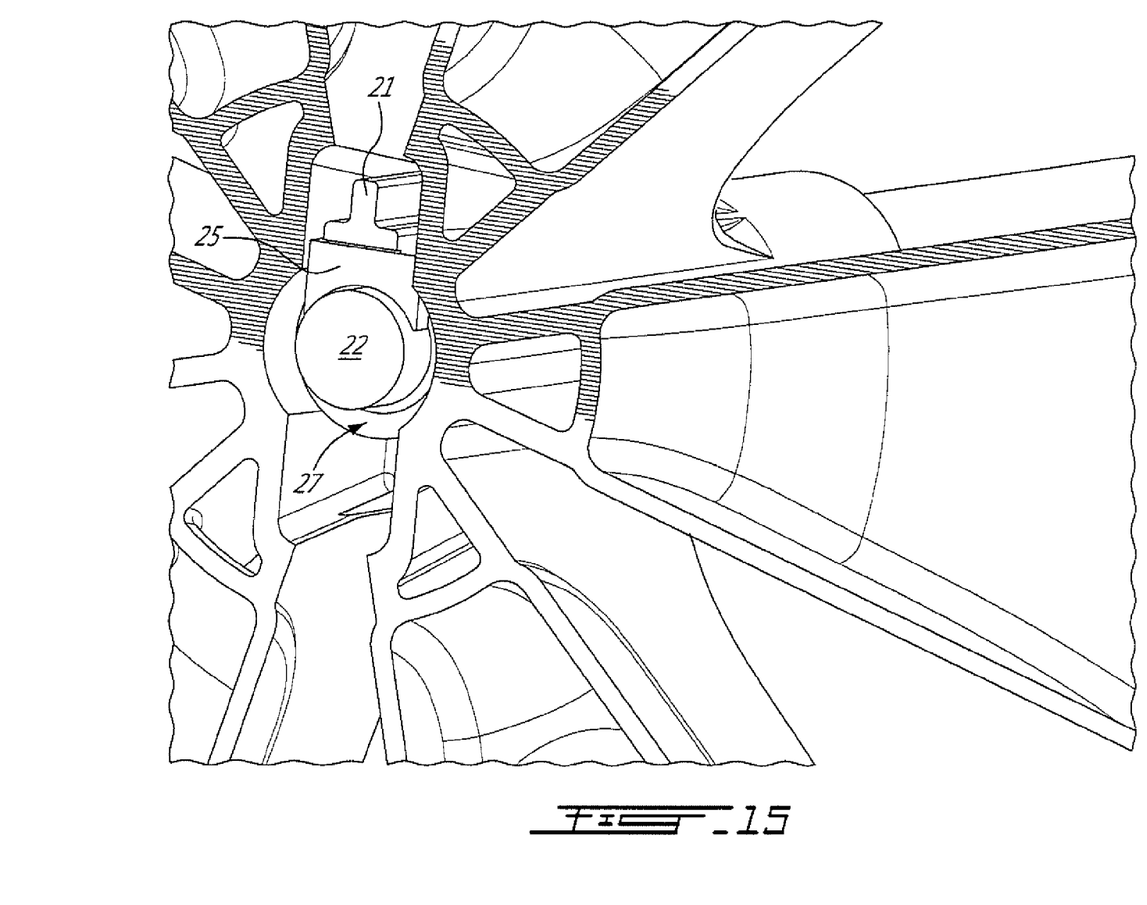
FIG. 15 is a section of a wheel assembly with the wheel of FIG. 14, at the level of a notch in the axle.

Alternatively, the axially extending axle receiving bore 12 may comprise one finger 21, integral with the wheel 10, extending towards the front wall 11 of the wheel 10, with a free end 23 thereof coming generally flush with the front wall 11 of the wheel 10 (see FIGS. 14 and 15). The finger 21 has a detent 25 facing inwardly, into the axle receiving bore 12. The detent 25 forms the locking element for the axle 22 in the axle receiving bore 12, the detent 25 releasingly engaging the axle in the axle receiving bore by flexing radially of the finger 21 as described hereinabove. The axle 22 may have a notch at a position on the circumference of the axle 22, or the axle 22 may have a continuous circumferential notch 27 on the circumference of the axle 22 as shown in FIG. 15.

Alternatively, the axially extending axle receiving bore may comprise more than two fingers, all integral with the wheel, extending towards the front wall of the wheel, each with a free end coming generally flush with the front wall of the wheel, and each with a detent facing inwardly into the axle receiving bore.

Figure 4:
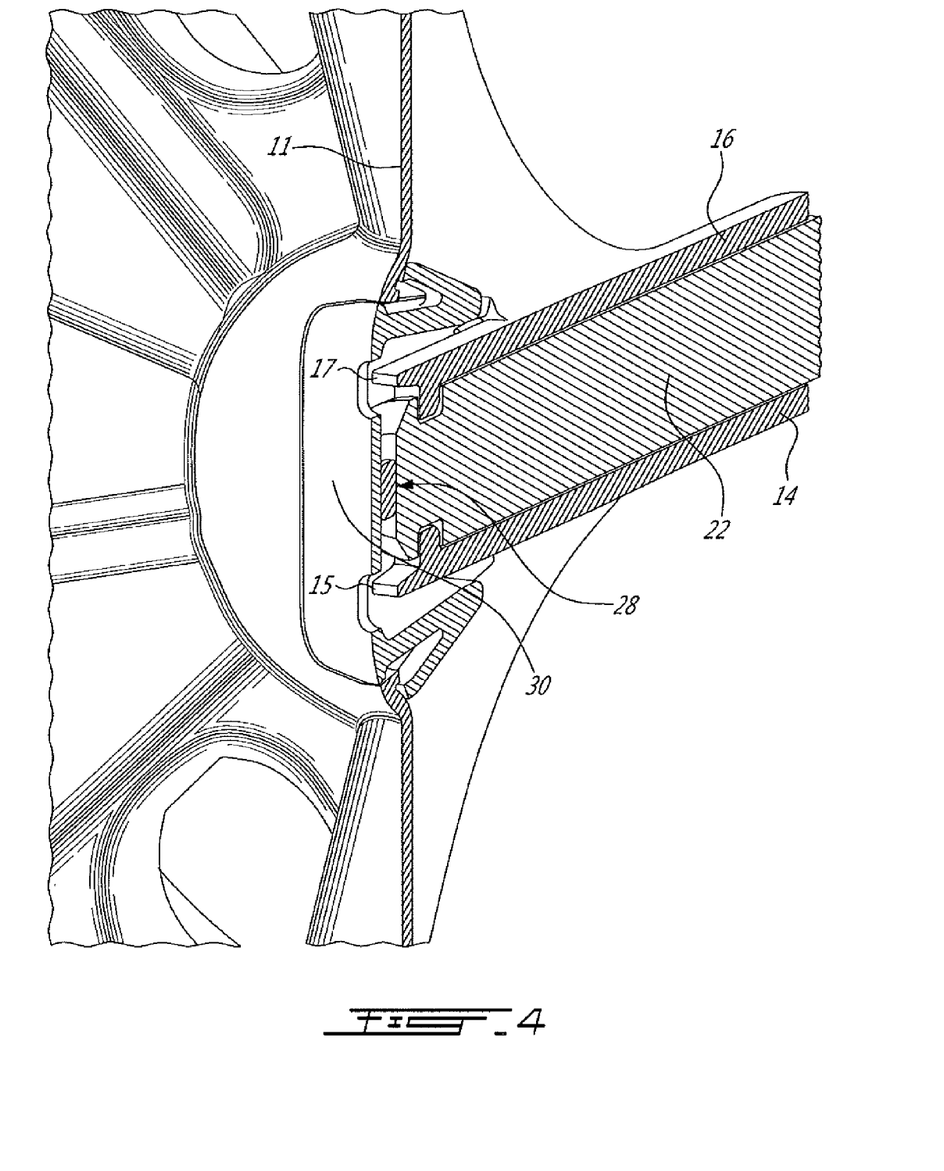
FIG. 4 shows a section of a wheel assembly according to an embodiment of an aspect of the present invention, with the axle inserted, and an outer cap.
Figure 5:
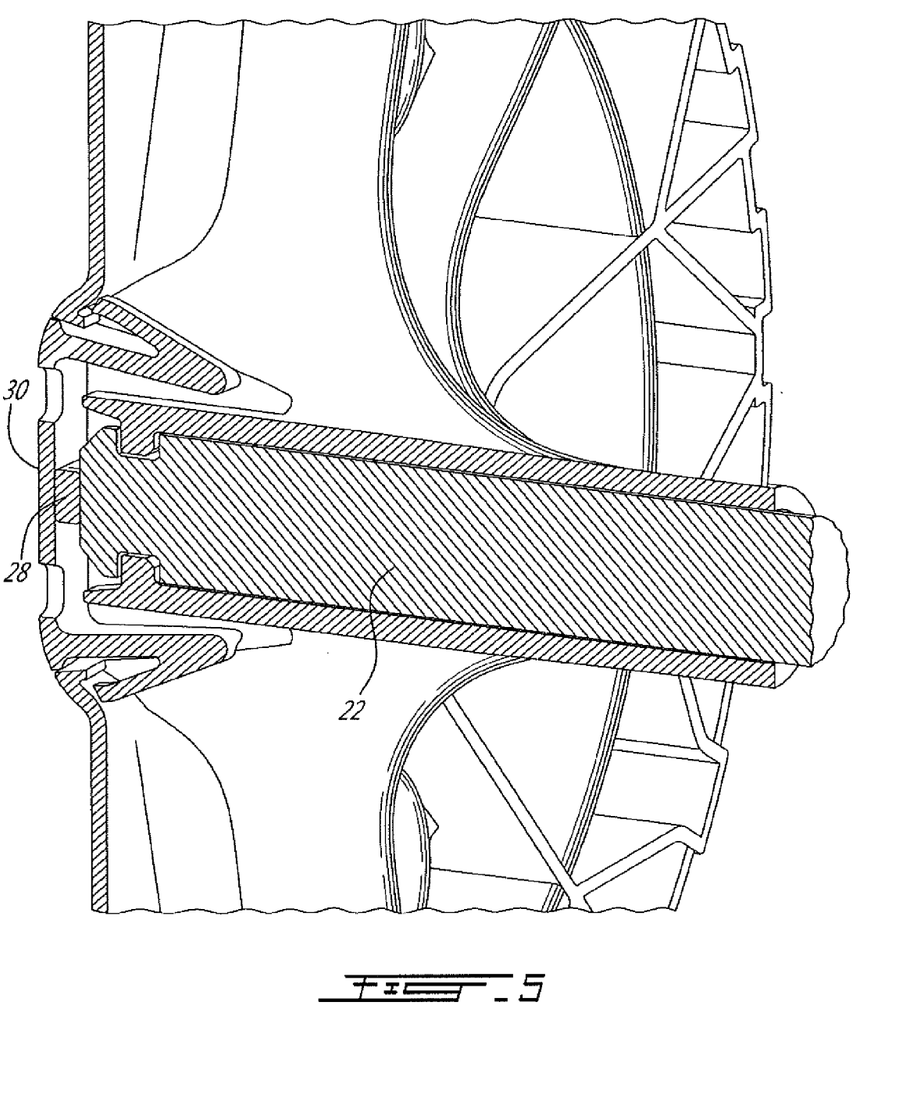
FIG. 5 shows a section of a wheel assembly according to an embodiment of an aspect of the present invention, with the axle inserted, and an outer cap.
Figure 6:
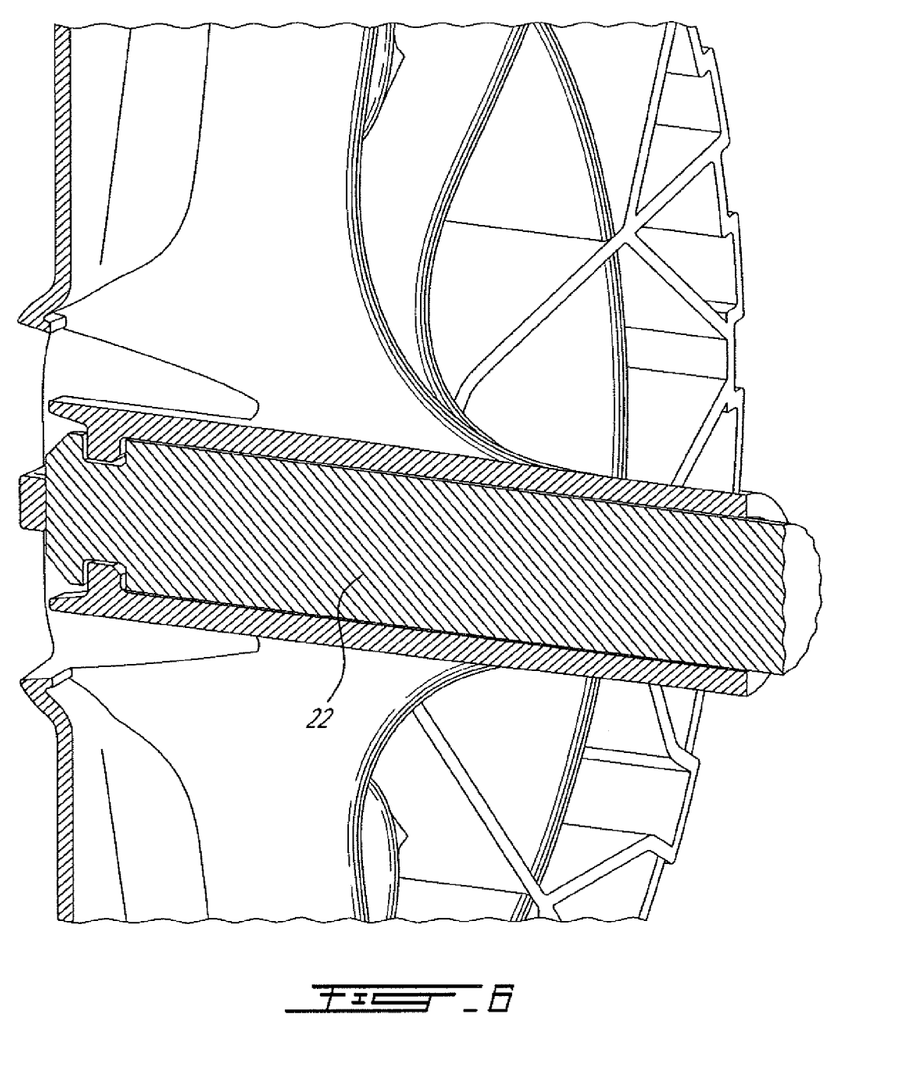
FIG. 6 shows a section of a wheel assembly according to an embodiment of an aspect of the present invention, with the axle inserted.
Figure 7:
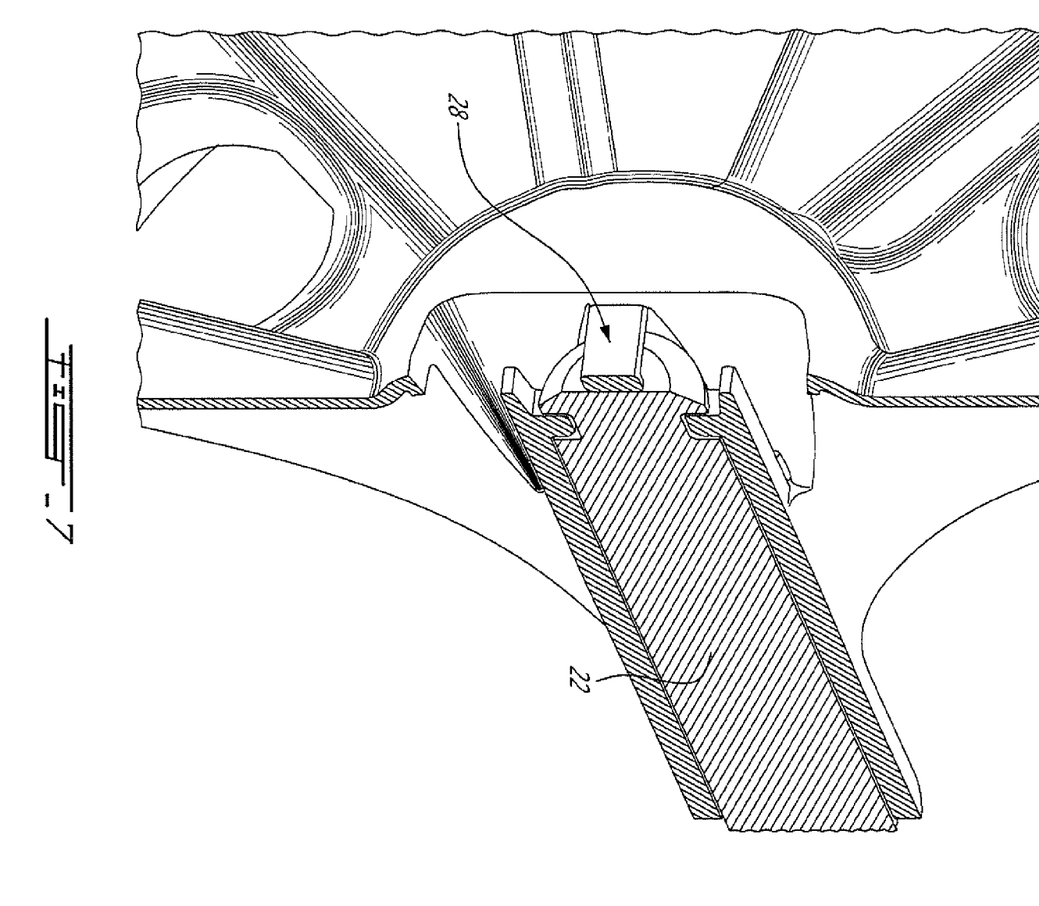
FIG. 7 shows a section of a wheel assembly according to an embodiment of an aspect of the present invention, with the axle inserted.
Figure 11:
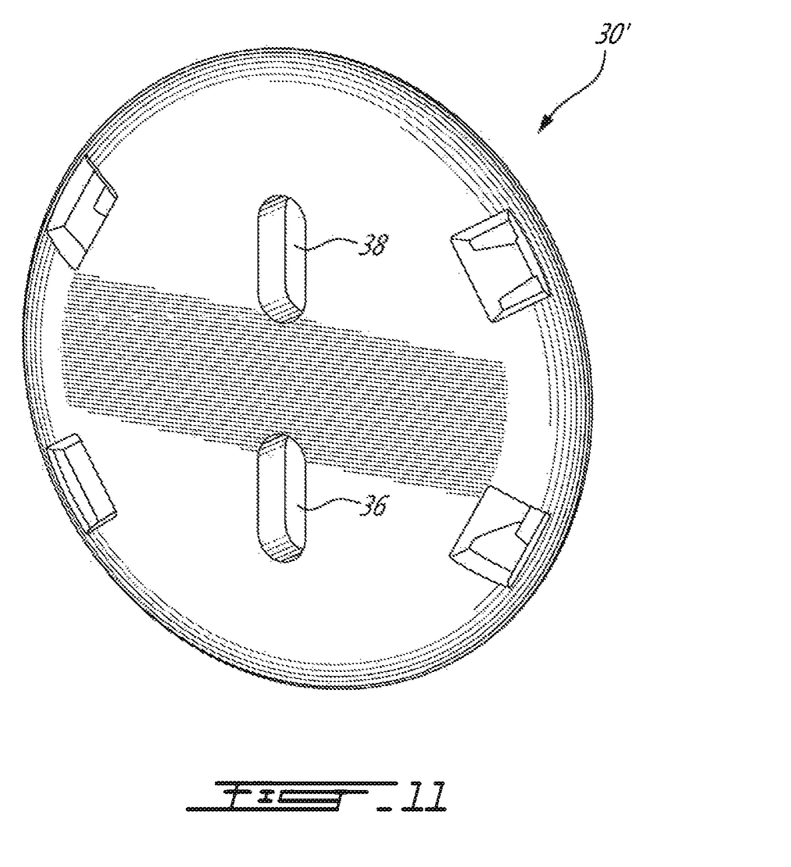
FIG. 11 is a front view of an outer cap according to an embodiment of an aspect of the present invention.
Figure 12:
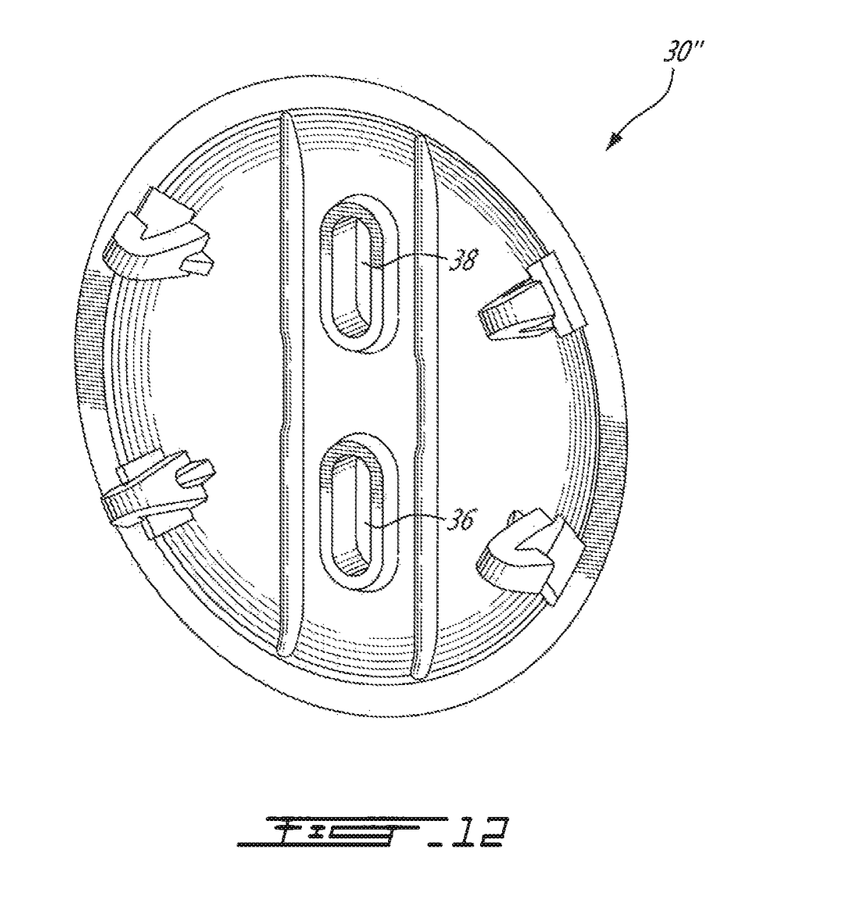
FIG. 12 is a rear view of the outer cap of FIG. 11.
Figure 13:
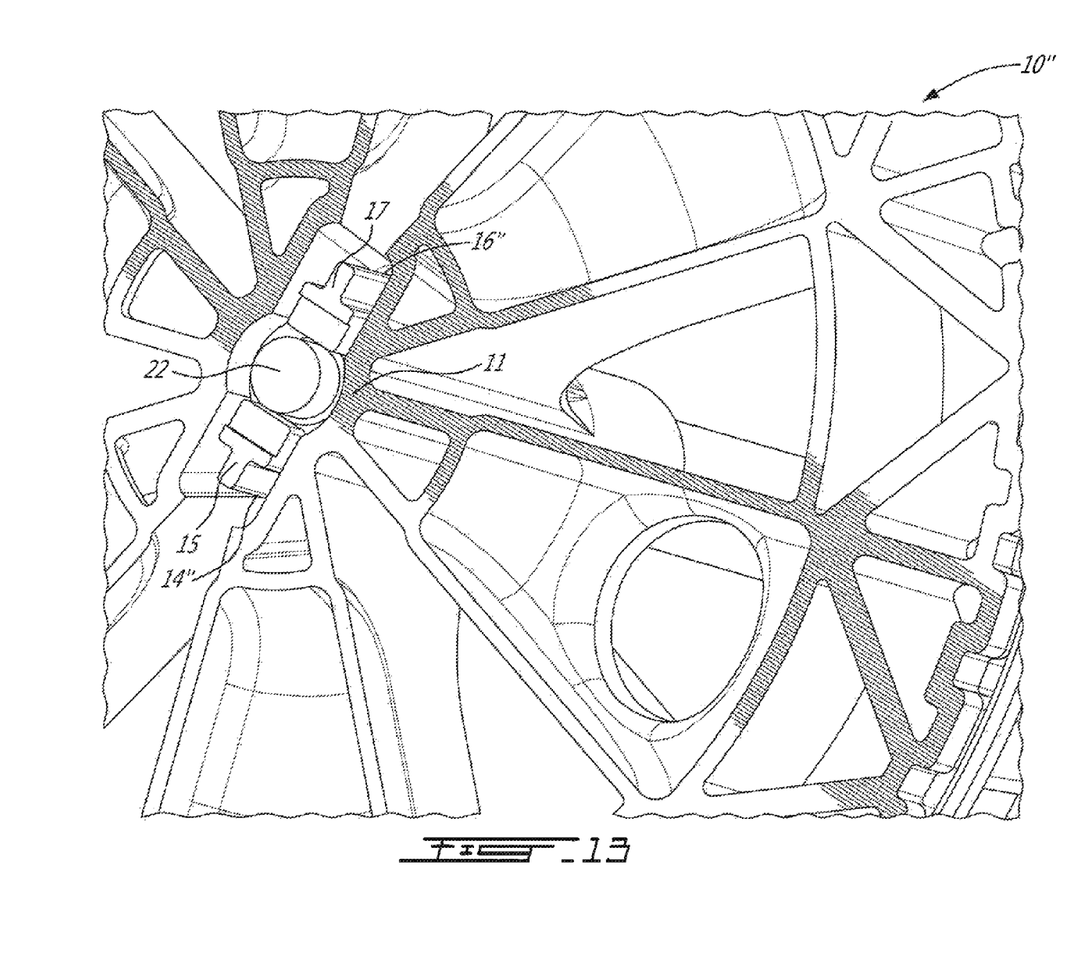
FIG. 13 shows a section of a wheel assembly according to an embodiment of an aspect of the present invention.

In the wheel assembly illustrated in FIGS. 3, 4, and 5 for example, an outer cap 30 is shown, covering the opening of the axle receiving bore 12 on the front of the wheel. The cap, such as 30', 30" shown by itself in FIGS. 11 and 12 respectively for example, is for aesthetic purposes. The cap 30 snaps under edges of the axle receiving bore 12 at 32, 34 on the front of the wheel as illustrated for example in FIG. 3. The cap 30 may comprise openings 36, 38 that allow access to the free ends 15, 17 of the fingers 14, 16, for example by inserting a tool, so as to push onto the free ends 15, 17 of the fingers 14, 16 so as to flex the fingers 14, 16 outwards and disengage the detents 18, 20 from the notches 24, 26 of the axle 22 as described hereinabove.

The present wheel and wheel assembly may be used on wheeled products such as refuse carts, wheeled coolers, wagons, wheel toys, BBQ, golf trolleys and the like for example.

The scope of the claims should not be limited by the embodiments set forth in the examples, but should be given the broadest interpretation consistent with the description as a whole.

What is claimed is:

1. A wheel for mounting to an axle of a wheeled product, said wheel comprising an axle receiving bore extending from a front wall to a rear wall of the wheel; said axle receiving bore comprising at least a first finger integral with the wheel and extending towards the front wall of the wheel, said first finger comprising a detent facing inwardly into said axle receiving bore, said first finger being adapted to be flexed from an insertion position to a locking position and from the locking position to an unlocking position, wherein:
   said first finger is flexed outwards in said insertion position as the axle is inserted within the axle receiving bore, and said first finger is flexed inwards to insert said detent into a first notch of the axle once the axle is inserted in said axle receiving bore in said locking position; and
   said first finger is flexed outwards, thereby disengaging said detent from said first notch in said unlocking position; and
   in said locking position, the free end of said first finger is accessible from the front wall of the wheel to flex said first finger from said locking position to said unlocking position;
   said wheel being further configured to receive a cap on the front wall thereof, said cap comprising openings allowing access to the free end of said first finger to flex said first finger from said locking position to said unlocking position.

2. The wheel of claim 1, wherein said axle receiving bore comprises a second finger integral with the wheel and extending towards the front wall of the wheel, each one of said first finger and second finger comprising a detent facing inwardly into said axle receiving bore, said fingers being adapted to be flexed from an insertion position to a locking position and from the locking position to the unlocking position, wherein said axle comprises a second notch on a circumference of said axle, wherein:
   said fingers are flexed outwards in said insertion position as the axle is inserted within the axle receiving bore, and said fingers are flexed inwards to insert said detents into the first notch and the second notch of the axle once the axle is inserted in said axle receiving bore in said locking position; and
   said fingers are flexed outwards, thereby disengaging said detents from said notches in said unlocking position.

3. The wheel of claim 1, further comprising a stopper, said stopper preventing the axle from being pushed outward of the front wall in said insertion position.

4. The wheel of claim 1, further comprising a cap, said cap covering the opening of said axle receiving bore.

5. The wheel of claim 1, further comprising a cap, said cap engaging edges of the axle receiving bore on the front wall of said wheel.

6. The wheel of claim 1, wherein the wheel is injection molded in a single step.

7. The wheel of claim 1, wherein said wheeled product is one of a refuse cart, a wheeled cooler, a wagon, a wheeled toy, a wheeled grill, and a golf trolley.

8. A wheel locking assembly, comprising:
   a wheel having an axially extending axle receiving bore comprising at least one finger integral with the wheel and extending towards a front wall of the wheel, said finger comprising a detent facing inwardly into said axle receiving bore, said detent releasingly engaging said axle in said axle receiving bore by flexing radially of said finger, further comprising a cap, said cap snapping on the front wall of said wheel, said cap comprising openings allowing access to a free end of said finger.

9. The wheel assembly of claim 8, wherein said axially extending axle receiving bore comprises a second fingers integral with the wheel and extending towards the front wall of the wheel, each finger comprising a detent facing inwardly into said axle receiving bore, said detents releasingly engaging said axle in said axle receiving bore by flexing radially of said fingers.

10. The wheel assembly of claim 8, wherein said axle comprises a notch and said detent releasingly engages said notch in said axle by inward flexing radially of said finger.

11. The wheel assembly of claim 8, wherein said detent is disengaged from the axle by pushing on a free end of the fingers from the front wall of said wheel.

12. A wheel with a built-in locking system for locking the wheel to an axle, said wheel comprising an axle receiving bore comprising fingers integral with the wheel and extending towards a front wall of the wheel, each finger comprising a detent facing inwardly into said axle receiving bore, said detents releasingly engaging the axle in said axle receiving bore by flexing radially of said fingers, further comprising a cap mounted on the front wall of said wheel, said cap comprising an access to a free end of said fingers, to enable a tool to be inserted through said cap for contactingly disengaging said detents from said axle.

13. The wheel of claim 12, wherein a free end of said fingers is accessible from said front wall of the wheel.

14. The wheel of claim 12, wherein a free end of said fingers is accessible from said front wall of the wheel, and said detents are releasable from engagement from said axle by action on said free ends.

15. The wheel of claim 12, wherein said detents disengage from said axle upon action on free ends of said fingers.

\* \* \* \* \*